(12) United States Patent
Wang et al.

(10) Patent No.: US 8,094,758 B2
(45) Date of Patent: Jan. 10, 2012

(54) EPHEMERIS DOWNLOAD FROM WEAK SIGNALS

(75) Inventors: Chi-Shin Wang, Half Moon Bay, CA (US); Yue-Meng Chen, Shanghai (CN); Zhike Jia, San Jose, CA (US); EnYuan Tu, Shanghai (CN)

(73) Assignee: SiRF Technology Holdings, Inc., San Jose, CA (US)

( * ) Notice: Subject to any disclaimer, the term of this patent is extended or adjusted under 35 U.S.C. 154(b) by 1400 days.

(21) Appl. No.: 11/612,426

(22) Filed: Dec. 18, 2006

(65) Prior Publication Data

US 2010/0328145 A1 Dec. 30, 2010

(51) Int. Cl.
*H04B 1/00* (2006.01)
(52) U.S. Cl. .................. 375/343; 375/142; 375/150
(58) Field of Classification Search .................. 375/340, 375/343, 140, 142, 147, 150; 701/207, 213, 701/215
See application file for complete search history.

(56) References Cited

U.S. PATENT DOCUMENTS

| | | | |
|---|---|---|---|
| 5,587,716 A | 12/1996 | Sheynblat | |
| 5,731,787 A | 3/1998 | Sheynblat | |
| 5,768,319 A | 6/1998 | Durboraw | |
| 6,515,620 B1 | 2/2003 | Jandrell | |
| 6,731,701 B2 | 5/2004 | Vorobiev | |
| 7,456,785 B2 * | 11/2008 | Houtman | 342/357.68 |
| 2005/0035904 A1 | 2/2005 | Jandrell | |

OTHER PUBLICATIONS

Divsalar et al., "Multiple-Symbol Differential Detection of MPSK", IEEE Transactions on Communications, vol. 38, No. 3, Mar. 1990, pp. 300-308.

Mackenthun, Jr., "A Fast Algorithm for Multiple-Symbol Differential Detection of MPSK", IEEE Transactions on Communications, vol. 42, No. 2/3/4, Feb.-Apr. 1994, pp. 1471-1474.
Lao, et al., "Multiple-Symbol Differential Detection with Interference Suppression", IEE Transactions on Communications, vol. 51, No. 2, Feb. 2003, pp. 208-217.
Schober et al., "DF-DD for Channels with Phase Noise", IEE Transactions on Communications, vol. 51, No. 6, Jun. 2003, pp. 890-893.
Kim et al., "Suboptimal Multiple-Symbol Differential Detection of MPSK with Diversity Reception", IEE Proc.-Commun., vol. 152, No. 4, Aug. 2005, pp. 469-475.
Pun et al., "Bit Error Probability and Computational Complexity of Bi-Directional Fano Multiple Symbol Differential Detectors", Information, Communications and Signal Processing, 2005 Fifth International Conference, Dec. 6-9, 2005, pp. 1540-1545.

\* cited by examiner

*Primary Examiner* — David Lugo
(74) *Attorney, Agent, or Firm* — Mark J. Danielson; Pillsbury Winthrop Shaw Pittman LLP

(57) ABSTRACT

The present invention provides systems and methods for downloading navigation data to a satellite receiver under weak signal conditions. In an embodiment, the receiver uses a tracking algorithm to estimate the Doppler frequency and rate of change of the Doppler frequency to compensate the phases of the I/Q samples from the received signal to reduce the effect of the Doppler frequency. In an embodiment, differential detection based data bit decoding is provided. In another embodiment, phase compensation based data bit decoding is provided, in which the phase of samples are rotated to compensate for phase error. In an embodiment, a multiple frame strategy is provided to increase signal-to-noise ratio (SNR) and improve sensitivity, in which similar placed samples in consecutive frames are coherently summed over the consecutive frames. In an embodiment, the samples are weighted to reduce the impact of noise in the multiple frame strategy.

20 Claims, 5 Drawing Sheets

FIG. 1 A GPS baseband hardware

FIG. 2 LEAST-MEAN-SQUARE APPROACH TO PREDICT DOPPLER FREQUENCY

FIG. 3 FLOWCHART OF NAVIGATION DATA PROCESSING

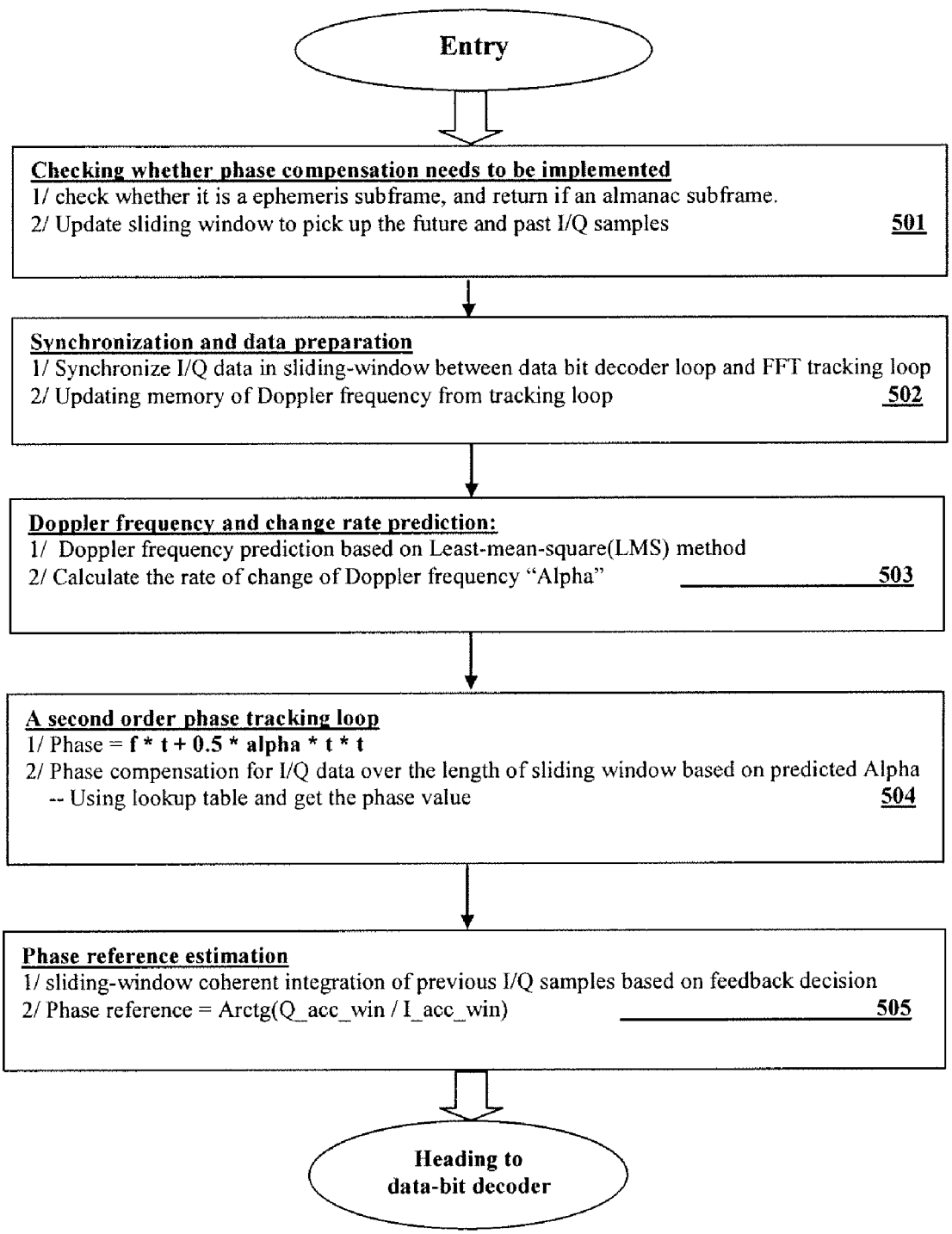
FIG 5 FLOWCHART OF PHASE COMPENSATION FOR EPHEMERIS DOWNLOAD

EPHEMERIS DOWNLOAD FROM WEAK SIGNALS

FIELD OF THE INVENTION

The present invention relates generally to navigational receivers, and more particularly to systems and methods that enable navigation receivers to download navigation data from weak satellite signals.

BACKGROUND OF THE INVENTION

With the development of radio and space technologies, several satellites based navigation systems have already been built and more will be in use in the near future. One example of such satellites based navigation systems is Global Positioning System (GPS), which is built and operated by the United States Department of Defense. The system uses twenty-four or more satellites orbiting the earth at an altitude of about 11,000 miles with a period of about twelve hours. These satellites are placed in six different orbits such that at any time a minimum of six satellites are visible at any location on the surface of the earth except in the polar region. Each satellite transmits a time and position signal referenced to an atomic clock. A typical GPS receiver locks onto this signal and extracts the data contained in it. Using signals from a sufficient number of satellites, a GPS receiver can calculate its position, velocity, altitude, and time.

A GPS receiver has to acquire and lock onto at least four satellite signals in order to derive the position and time. Usually, a GPS receiver has many parallel channels with each channel receiving signals from one visible GPS satellite. The acquisition of the satellite signals involves a two-dimensional search of carrier frequency and the pseudo-random number (PRN) code phase. Each satellite transmits signals using a unique 1023-chip long PRN code, which repeats every millisecond. The receiver locally generates a replica carrier to wipe off residue carrier frequency and a replica PRN code sequence to correlate with the digitized received satellite signal sequence. During the acquisition stage, the code phase search step is a half-chip for most navigational satellite signal receivers. Thus the full search range of code phase includes 2046 candidate code phases spaced by a half-chip interval. The carrier frequency search range depends upon the Doppler frequency due to relative motion between the satellite and the receiver. Additional frequency variation may result from local oscillator instability.

Coherent integration and noncoherent integration are two commonly used integration methods to acquire GPS signals. Coherent integration provides better signal gain at the cost of larger computational load, for equal integration times.

The power associated with noncoherent integration with one millisecond correlation is $$\text{Power} = \sum_{n=0}^{N-1} (I(n)^2 + Q(n)^2)$$

and the power associated with coherent integration is $$\text{Power} = \left(\sum_{n=0}^{N-1} I(n)\right)^2 + \left(\sum_{n=0}^{N-1} Q(n)\right)^2$$

where I(n) and Q(n) denote the in-phase and quadra-phase parts of one-millisecond correlation values from the baseband section at interval n, and N denotes the desired number of one-millisecond integration intervals.

The signals from the navigational satellites are modulated with navigational data at 50 bits/second. This data consists of ephemeris, almanac, time information, clock and other correction coefficients. This data stream is formatted as sub-frames, frames and super-frames. A sub-frame consists of 300 bits of data and is transmitted for 6 seconds. In this sub-frame a group of 30 bits forms a word with the last six bits being the parity check bits. As a result, a sub-frame consists of 10 words. A frame of data consists of five sub-frames transmitted over 30 seconds. A super-frame consists of 25 frames sequentially transmitted over 12.5 minutes.

The first word of a sub-frame is always the same and is known as TLM word and first eight bits of this TLM word are preamble bits used for frame synchronization. A Barker sequence is used as the preamble because of its excellent correlation properties. The other bits of this first word contains telemetry bits and is not used in the position computation. The second word of any frame is the HOW (Hand Over Word) word and consists of TOW (Time Of Week), sub-frame ID, synchronization flag and parity with the last two bits of parity always being '0' s. These two '0' s help in identifying the correct polarity of the navigation data bits. The words 3 to 10 of the first sub-frame contains clock correction coefficients and satellite quality indicators. The 3 to 10 words of the sub-frames 2 and 3 contain ephemeris. These ephemeris are used to precisely determine the position of the GPS satellites. These ephemeris are uploaded every two hours and are valid for four hours to six hours. The 3 to 10 words of the sub-frame 4 contain ionosphere and UTC time corrections and almanac of satellites 25 to 32. These almanacs are similar to the ephemeris but give a less accurate position of the satellites and are valid for six days. The 3 to 10 words of the sub-frame 5 contain only the almanacs of different satellites in different frames.

The superframe contains twenty five frames. The contents of the sub-frame 1, 2 and 3 repeat in every frame of a superframe except the TOW and occasional change of ephemeris every two hours. Thus the ephemeris of a particular satellite signal contains only the ephemeris of that satellite repeating in every frame. However, almanacs of different satellites are broadcast in-turn in different frames of the navigation data signal of a given satellite. Thus a total of 25 consecutive frames transmit the almanacs of all the 24 satellites in the sub-frame 5. Any additional spare satellite almanacs are included in some of the sub-frame 4.

The almanac and ephemeris are used in the computation of the position of the satellites at a given time. The almanacs are valid for a longer period of six days but provide a less accurate satellite position and Doppler compared to ephemeris. Therefore, almanacs are not used when a fast position fix is required. On the other hand, the accuracy of the computed receiver position depends upon the accuracy of the satellite positions which in-turn depends upon the age of the ephemeris. The use of current ephemeris results in better and faster position estimation than one based on non-current or obsolete ephemeris. Therefore, it is necessary to use current ephemeris to get a fast receiver position fix.

A GPS receiver may acquire the signals and estimate the position depending upon the already available information. In the 'hot start' mode the receiver has current ephemeris and the position and time are known. In another mode known as 'warm start' the receiver has non-current ephemeris but the initial position and time are known as accurately as the in the case of previous 'hot start'. In the third mode, known as 'cold start', the receiver has no knowledge of position, time or ephemeris. As expected the 'hot start' mode results in low Time-To-First-Fix (TTFF) while the 'warm start' mode which has non-current ephemeris may use that ephemeris or the almanac resulting in longer TIFF due to the less accurate Doppler estimation. The 'cold start' takes still more time for the first position fix as there is no data available to aid signal acquisition and position fix.

After the signal from a satellite has been acquired, the receiver goes to track mode during which the receiver tracks the signal and also downloads the 50 bits/second navigation data. When the signal is strong, the data can be downloaded without error and within the shortest time possible. However, when the received satellite signal is weak due to operation indoors or due to buildings or foliage obstructing the signal, the receiver takes more time to acquire the signal and later during the tracking process it may not be able to correctly down load the navigation data. To resolve this problem, present day receivers receive assistance data containing the current ephemeris through a server or cellular base station. However, this requires additional infrastructure and an arrangement with cellular service providers, making this approach expensive and dependant on many outside factors. There are some patented techniques of downloading the navigation data in standalone mode. U.S. Pat. Nos. 5,731,787 and 5,587,716 disclose a navigation data prediction method that is used when there is no DGPS message reception. U.S. Pat. No. 6,515,620 and U.S. patent application 2005/0035904 which deal with standalone receivers, disclose a technique where only part of the navigation data are predicted. U.S. patent application 2003/0152134 also discloses predicting some of the data bits and overlaying data frames. U.S. Pat. No. 5,768, 319 assigned to Motorola discloses a method based on overlaying several of the consecutive frames and deciding the value of each bit by computing the average power of the similarly placed bits. But that method is not efficient as it depends on the dot product of I and Q components in the discriminator without phase estimation over a long time interval.

Therefore, there is a need for a standalone receiver capable of downloading the ephemeris under weak signal conditions without the drawbacks associated with present day approaches.

SUMMARY

Accordingly, the present invention provides systems and methods for downloading navigation data to a satellite receiver under weak signal conditions.

In an embodiment, the receiver uses a tracking algorithm to estimate the Doppler frequency and rate of change of the Doppler frequency to compensate the phases of the I/Q samples from the received signal to reduce the effect of the Doppler frequency. In an embodiment, the rate of change of the Doppler frequency is assumed to be constant for a static situation, i.e., receiver is relatively stationary, and a Least-Mean-Square (LMS) algorithm is applied to a set of estimated Doppler frequencies over time to determine the rate of change of the Doppler frequency. In another embodiment, a Kalman filtering technique is used to the estimate the Doppler frequency and the rate of change of the Doppler frequency for a dynamic situation, i.e., receiver is in motion.

In an embodiment, differential detection based data bit decoding is provided. In this embodiment, decision feedback is used to coherently integrate a sliding window of previous I/Q samples and Multiple Symbol Differential Detection (MSDD) is used to coherently integrate a sliding window of future I/Q samples. Differential detection is then performed on the coherent integrations of the previous and future samples to decode a data bit based on a phase transition between the two sliding windows. The differential detection based decoding may be used when the bit error is too high to accurately track phase error.

In an embodiment, phase compensation based data bit decoding is provided. In this embodiment, each sample from the received signal is phase rotated to compensate for phase error. In one embodiment, the phase for the phase rotation is computed based on an overall phase of samples within a sliding window. The data bit of a phase rotated sample is determined by the sign of the real part or in-phase (I) component of the weighted phase rotated samples. In an embodiment, each phase rotated sample is weighted to reduce the impact of nosier samples. In one embodiment, a weighting factor is computed for a phase rotated sample based on a phase of the phase rotated sample, and the weighting factor applied to the phase rotated sample.

In an embodiment, a multiple frame strategy is provided to increase the signal-to-noise ratio (SNR) and improve sensitivity. In one embodiment, the multiple frame strategy is applied to the weighted phase rotated sample by overlaying consecutive 30-second frames and coherently summing weighted phase rotated samples in the same position in the frames. This results in an integrated frame, in which each integrated sample in the integrated frame is the accumulated energy of similarly placed weighted phase rotated samples in the frames. Data bit decoding may be done by determining the sign of the real part or in-phase (I) component for each integrated sample. Preferably, only samples corresponding to the ephemeris are integrated over consecutive frames since other data, such as the almanac, do not repeat in every frame. In another embodiment, the multiple frame strategy is performed based on the differential detection based decoding.

The above and other advantages of embodiments of this invention will be apparent from the following more detailed description when taken in conjunction with the accompanying drawings.

BRIEF DESCRIPTION OF THE DRAWINGS

FIG. 5 is a flowchart illustrating phase compensation for ephemeris download according to an embodiment of the invention.

DETAILED DESCRIPTION

Figure 1:
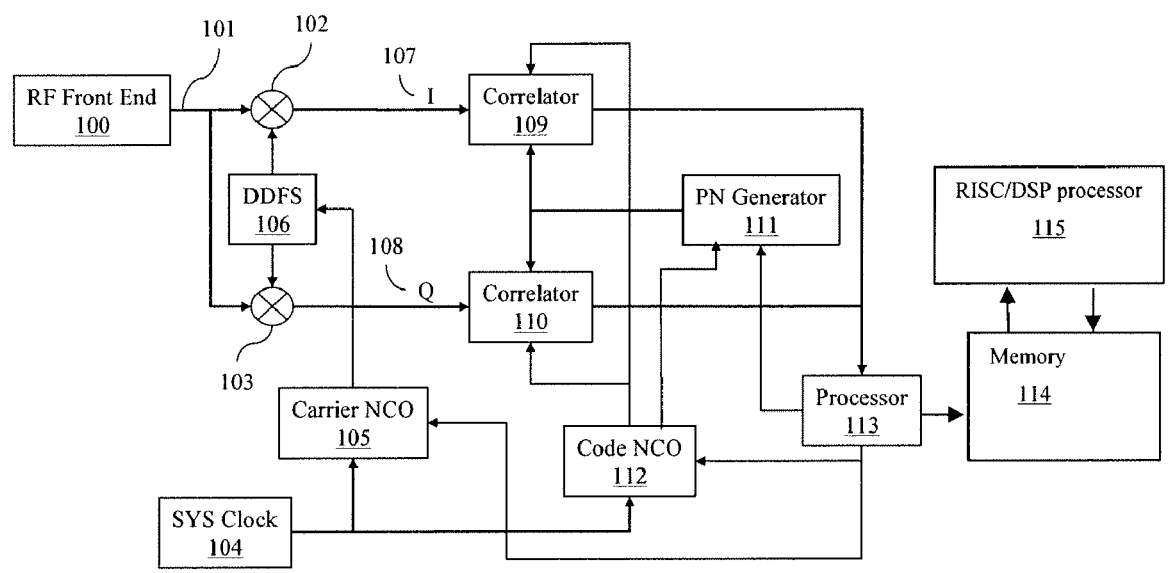
FIG. 1 is a block diagram illustrating a GPS receiver according to an embodiment of the present invention.

FIG. 1 illustrates a receiver according to a preferred embodiment of the invention. An intermediate frequency (IF) signal input 101 enters a baseband section of the receiver from an analog-to-digital converter (ADC) output of a conventional RF front-end 100. The IF input is multiplied in IF mixers 102 and 103 in-phase and in quadrature, respectively, with a local frequency signal generated by a direct digital frequency synthesizer (DDFS) 106. This mixing involves multiplying the ADC output 101 by the local DDFS frequency in-phase which generates the in-phase component I 107. In a parallel path the same signal 101 is multiplied by the DDFS frequency in quadrature (i.e., with a phase shift of 90 degrees) to produce quadrature component Q 108. The DDFS 106 is driven by a carrier numerically controlled oscillator (NCO) 105. In addition, carrier NCO 105 receives phase and frequency corrections from a processor 113. Because of this correction, the DDFS frequency and phase is almost the same as that of the ADC output 101. Thus the I and Q signals produced by the IF mixers 102 and 103 are at near zero carrier frequency after being low-pass filtered to remove the high frequency components which are at twice the IF frequency band.

The I and Q components 107 and 108 are correlated in correlators 109 and 110, respectively, with a locally-generated PRN sequence generated by a PRN generator 111. The PRN-sequence corresponds to the satellite whose signal is being processed by the baseband section at that time. The PRN sequence generator is driven by code NCO 112. The local code frequency is made equal to the code rate of I and Q paths by corrective feedback from processor 113 to the code NCO 112. In addition, processor 113 sends a signal to PRN code generator 111 to set the starting phase of the locally generated code. The NCO 112 provides the correct clock signals to correlators 109 and 110. For example, NCO 112 provides a clock signal to generate two samples per PRN chip in the signal acquisition stage and three samples per chip during the tracking stage. SYS CLK 104 provides to NCO 105 and NCO 112 a common clock synchronization signal. The correlator outputs are then sent to processor 113 at every millisecond interval. The processor 113 is preferably a digital signal processor (DSP) core suitable for high speed arithmetic computations. Subsequent processing of the signals take place in the processor 113, as will be described in detail below. Additional details of the receiver baseband section described above are contained in U.S. patent application Ser. No. 11/123,861 filed on May 6, 2005, the specification of which is incorporated herein by reference.

The DSP core 113 receives one millisecond integrated (correlated) I and Q values from the GPS baseband section described above. In order to acquire a GPS signal in the DSP processor, all dwells (set of carrier frequency, code offset) are searched. This is a two-dimensional search. Coherent integration and non-coherent integration are two commonly used integration methods to acquire GPS signals. Coherent integration provides better signal gain at the cost of larger computational load, for equal integration times.

A method for downloading ephemeris from weak signals according to an embodiment of the invention can be divided into two parts, the first part being signal tracking and the second part being ephemeris download. The tracking part is responsible for predicting the rate of change of the Doppler frequency, while the ephemeris download function performs phase compensation and integration.

FIG. 1 illustrates components of the receiver that may be used to implement methods of the invention. In this example, the one millisecond correlation samples are stored in memory 114. This memory 114 is also used to store any intermediate results, and may include buffers. processor 115, e.g., RISC or DSP processor, performs the FFT computation to determine the carrier frequency and associated frequency or phase compensation, sliding window integration, data bit synchronization and demodulation, which are described below. The frame overlay strategy is also implemented through this processor.

Thus, the carrier tracking is done in software through FFT by the processor 115. The carrier tracking may also be implemented in hardware.

Figure 2:
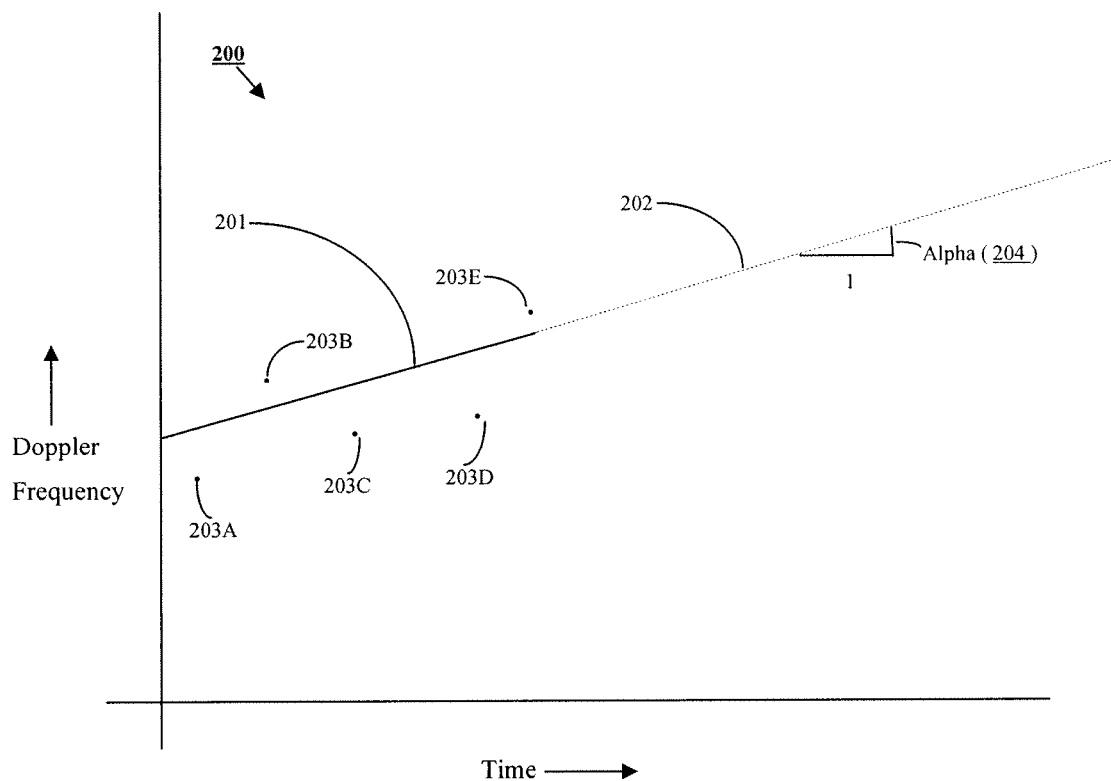
FIG. 2 illustrates a method to predict Doppler frequency and rate of change of Doppler frequency according to an embodiment of the present invention.

During the signal tracking, the one ms samples to the processor 113 can be divided into blocks of samples, e.g., 2560 samples per block. The Doppler frequency is computed for each block, e.g., by performing a Fast Fourier Transform (FFT) over the length, e.g., 2560 ms, of the block. The Doppler frequency is given by the peak of the FFT. The Doppler frequency for each block is stored in memory. FIG. 2 shows a set of computed Doppler frequencies 203A, 203B, 203C, 203D, 203E, etc. over time. The Doppler frequencies may be computed using other methods besides FFT. For example, the Doppler frequency at a particular time may be computed based on the relative velocity of the satellite to the receiver. In this example, the receiver may compute the velocity of the satellite at a particular time using stored ephemeris or almanac. The velocity of the receiver may be computed based on an approximate receiver position and the known spin of the Earth. The approximate receiver position may be given by the last saved position fix. Once the velocities of the satellite and receiver are known, their relative velocity and the resulting Doppler frequency can be computed.

The rate of change of the Doppler frequency is then predicted. When the receiver is relatively stationary, the rate of change of the Doppler frequency, $\alpha$, can be assumed to be constant over a period of several minutes. Thus, the prediction can be linear with the rate of change of the Doppler frequency, $\alpha$, being constant. The rate of change can be predicted using a Least-Mean-Square (LMS) error approach to find a line that best fits the set of Doppler frequencies, where the rate of change is given by the slope of the line. An example of this is shown in FIG. 2, in which the line 201 is fitted to the set of Doppler frequencies 203A, 203B, 203C, 203D, 203E, etc. over a time interval, e.g., 60 seconds. The rate of change of the Doppler frequency 204, $\alpha$, is given by the slope of line 201. This rate of change, a, is valid for a period of several minutes assuming the receiver is mostly stationary. The rate of change need not be assumed to be linear and higher-order frequency dependencies may be taken into account by fitting a higher-order polynomial to the set of Doppler frequencies. For a dynamic situation, a Kalman filtering technique may be used to estimate the Doppler frequency and rate of change of Doppler frequency. A more detailed description of Kalman filter based tracking is provided in Appendix A.

Thus, if $f_{do}$ is the initial Doppler frequency at time $t=t_0$ and $\alpha$ is the range of change of the Doppler frequency, then the Doppler frequency $f_d$ at a time t is given by:

$$f_d = f_{do} \pm \alpha * (t-t_0) \quad (1)$$

where ± indicates that the Doppler frequency can be either increasing or decreasing. The FFT over the length of the block, e.g., 2560 ms, determines the Doppler frequency at the center of the block. Thus, to compute the frequency $f'_{new}$ at the start of the block, the time base must be adjusted from the center of the block to the start of the block. If $f_{new}$ is the Doppler frequency at the center of a block, then the frequency $f'_{new}$ at the start of the block is given by:

$$f'_{new} = f_{new} - \alpha * (\text{block}/2) \quad (2)$$

where $\alpha$ is in Hz/s. In preferred embodiment, the block has a length of 2560 ms or 2.56 seconds.

The phase within the block can be given by:

$$\text{Phase}(i) = f'_{new} * i * pi * 2 + \alpha * pi * i * i; \quad (3)$$

where $\alpha$ is in Hz/s, i is the time index of the $i^{th}$ sample in the block, and pi=3.14152, which is an approximation of $\pi$. In the preferred embodiment, the samples are down-sampled by a ratio of 20:1 to reduce the number of samples and associated computational load. Therefore, each down-sampled sample has a length of 20 ms, which corresponds to one data bit. The down-sampling may be performed by summing 20 ms samples for each down-sampled sample. Thus, in the preferred embodiment, the time index is incremented by 20 ms or 0.02 seconds for the down-sampled samples. The phase compensation above is applied to the down-sampled samples to reduce phase changes caused by Doppler frequency and Doppler frequency change rate.

Figure 3:
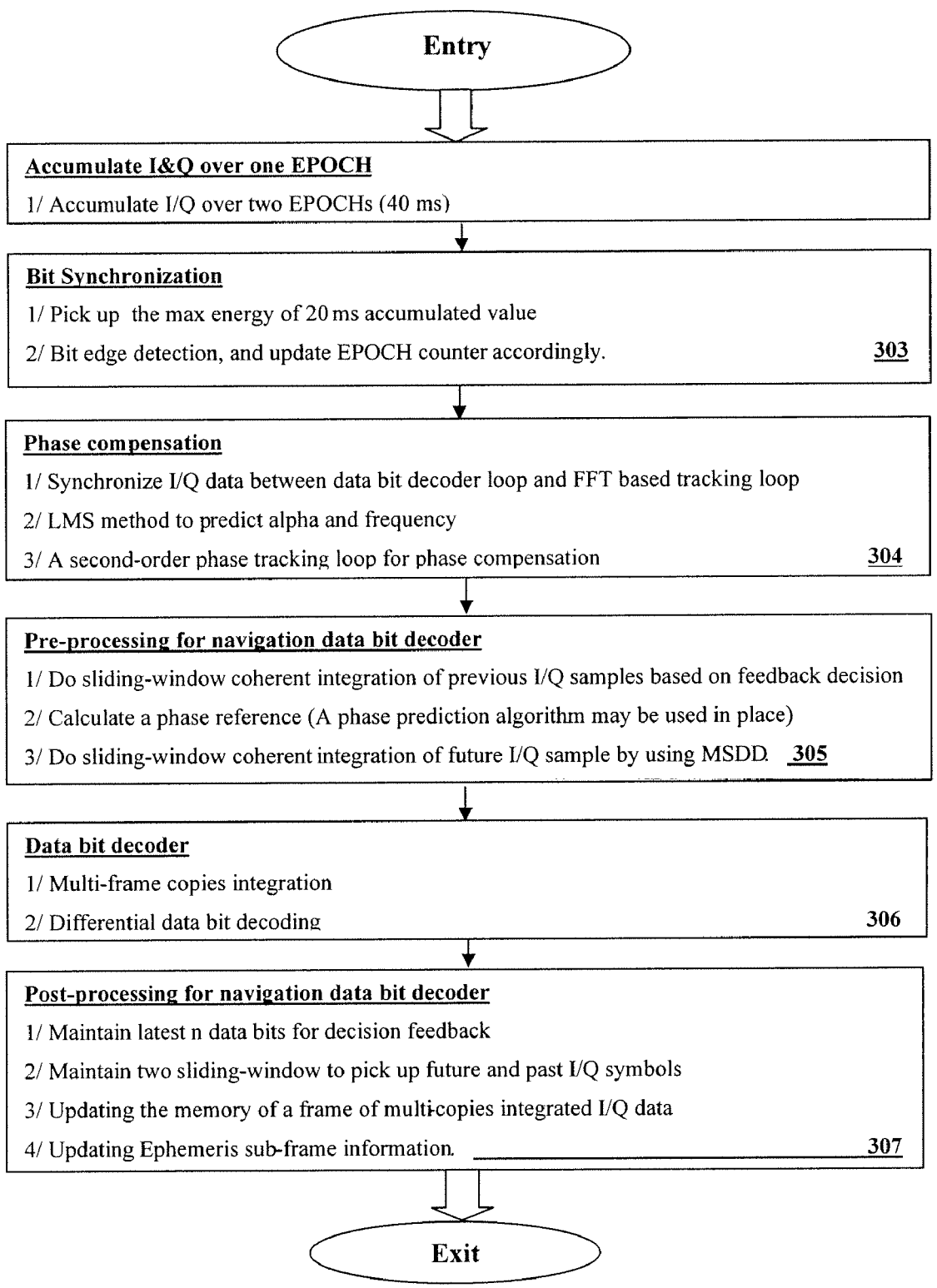
FIG. 3 is a flowchart illustrating navigation data processing according to an embodiment of the present invention.

FIG. 3 illustrates a process of data bit decoding according to an embodiment. One ms samples for both the I and Qs are accumulated over intervals of two epochs or 40 ms in block 302. The bit edge is detected by picking up 20 ms samples with maximum energy over an epoch in block 303. This ensures that bit decoding is performed at the proper bit edges. The Doppler frequency and rate of change of Doppler frequency are determined using an LMS algorithm or other method as shown in block 304. These values are useful in compensating the phase and integrating the ephemeris to improve sensitivity. A combination of decision feedback loop and multiple symbol differential detection are used to perform sliding-window coherent integration of previous and future I/Q samples as shown in block 305. Differential data bit decoding is then performed as shown in block 306 and includes maintaining sliding window and decision feedback loop as well as updating the memory of frame I/Q integration.

Differential detection based data bit decoding according to an embodiment will now be described in more detail. This data bit decoding uses a sliding-window coherent integration of previous N×20 ms I/Q samples and a sliding-window coherent integration of future M×20 ms I/Q samples, where each 20 ms I/Q sample corresponds to one data bit, and n and m are integers. Therefore, the sliding window of previous samples has a length of N×20 ms and the sliding window of future samples has a length of M×20 ms.

The coherent integration for the previous sliding window of N×20 ms is performed by using the previously decoded bits to demodulate (wipe off data bits from) the I/Q samples within the previous sliding window and coherently integrate the demodulated I/Q samples. Thus decision feedback is used to demodulate and coherently integrate the I/Q samples within the previous sliding window. The previous n decoded data bits used for feedback are preferably stored in a feedback buffer having a length of N data bits.

In the future sliding window of M×20 ms, Multiple Symbol Differential Detection (MSDD) is used to demodulate and coherently integrate the I/Q samples within the future sliding window. A more detailed description of MSDD based coherent integration is provided in Appendix B.

Differential detection is then used to decode the data bit based on the coherent integration of the previous N×20 ms I/Q samples and the future M×20 ms I/Q samples. The differential decoding may be performed by computing a phase angle transition-between the past and future coherent integrations. The phase angle transition may be performed by taking a dot product of the two integrations, e.g., by multiplying the future integration against the conjugate of the past integration and taking the real part. After the data bit is decoded, the previous and future sliding widows are moved forward by 20 ms to decode the next data bit. The Differential detection approach is useful to provide a first round of data bit decoding when the bit error rate is high, in which case the phase may be inversed 180 degrees (phase ambiguity) and the sign reversed.

Figure 4:
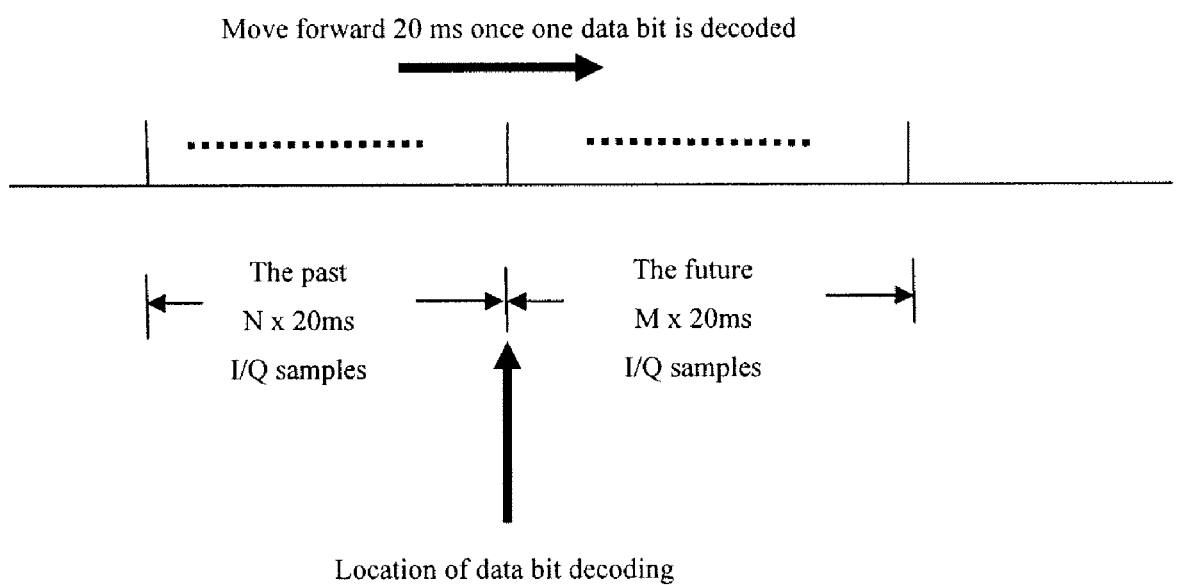
FIG. 4 illustrates a differential detection based data bit decoding according to an embodiment of the present invention.

The differential detection based data bit decoding is illustrated in FIG. 4, which shows the sliding window of past N×20 ms I/Q samples and the sliding window of future M×20 ms I/Q samples. The sliding windows are moved forward 20 ms once a data bit is decoded to decode the next data bit. The decoded data bit corresponds to the first 20 ms sample (on the very left) in the future sliding window. This 20 ms sample is moved to the past sliding window after its data bits is decoded and the sliding windows are moved forward 20 ms.

The length of the sliding windows may be adaptive based on the error rate of the data bits. For example, the length of the sliding windows may be short when the signal is weak and the error rate high, while the length may be long when the error rate of the data bits becomes small.

A method for performing the differential detection according to an embodiment will now be described. Let sum_n and sum_m denote the coherent sums of the past and future windows, respectively. The phase of sum_n is then computed according to:

$$phi = \arctan g(sum\_n) \quad (4)$$

where phi is the phase of sum_n. The phase of the sum_m is then rotated by phi according to:

$$sum\_m\_hat = sum\_m * \exp(-j*phi) \quad (5)$$

where sum_m_hat is the phase rotated sum_m. The data bit is determined by the sign of the real part of sum_m_hat, which is denoted by Re[sum_m_hat]. This sign represents the phase transition between two consecutive samples. If the sign is positive, the data bit for the present 20 ms sample is the same as that of the previous 20 ms sample, otherwise the data bit for the present 20 ms sample is reversed to that of the previous 20 ms sample.

The differential detection based decoding provides one method of decoding the data bits. Another method referred to as phase compensation data bit decoding is given below.

In an embodiment, the I/Q samples are phase rotated to reduce the effect of phase offset. In this embodiment, an overall phase for a sliding window is determined based on the coherent integrations of the demodulated Q/I samples within the window. The samples are demodulation using decision feedback as discussed above. The overall phase of the sliding window is given by:

$$Phase_{overall} = \arctan g(Q\_acc\_win/I\_acc\_win) \quad (6)$$

where Q_acc_win and I_acc_win are the coherent integrations or sums of the Q/I samples within the sliding window. The length of the window may be 320 ms, which comprises 16 20 ms samples. In an embodiment, the phase of all the I/Q samples within the M×20 ms window are rotated by the overall phase of the N×20 ms window according to:

$$Iri + jQri = [Ii + jQi] * \exp(-j*Phase_{overall}) \quad (7)$$

where Iri and Qri represent the phase rotated 20 ms samples. This phase rotation causes the average phase within the sliding window to be close to zero, thereby reducing phase offset.

After each 20 ms sample Qi and Ii has been phase rotated, a weighting factor may be applied to each phase rotated 20 ms sample to compensate for noise of the 20 ms sample. The weighting factor Wi for each 20 ms sample is given by:

$$Wi = 1 - 2 * \arctan g(|Qri/Iri|)/pi \quad (8)$$

The weighting factor is function of the phase of the phase rotated samples Qi and Ii.

The higher the phase, the lower the weighting factor because a higher phase corresponds to greater noise. Thus, the weighting factor gives less weight to noisier samples.

The weighting factor is applied to the phase rotated 20 ms sample as follows:

$$Irwi = Wi * Iir \quad (9)$$

$$Qrwi = Wi * Qir \quad (10)$$

where Irwi and Qrwi represent the weighted phase rotated samples.

FIG. 5 illustrates the phase compensation for a sliding window sample set with a length of, e.g., 320 ms. In block 501 the sliding window is updated to collect the future and past I/Q samples. In block 501 only the ephemeris is collected and the almanac is not stored. In block 502 the Doppler frequency from the FFT tracking loop is collected for later LMS based prediction of Doppler frequency and rate of change of the Doppler frequency. In block 503 a Least-Mean-Square (LMS) algorithm is used to predict the Doppler frequency and the rate of change of the Doppler frequency. In block 504, a second order phase tracking loop estimates the phase for I/Q data within a sliding window. The phase rotation computation and compensation are applied to all I/Q data over the length of the sliding window. The phase reference is calculated in block 505 by the sliding-window coherent integration of previous I/Q samples based on decision feedback.

Phase compensation based data bit decoding will now be described according to an embodiment. The phase compensation based decoding computes weighted phase rotated samples, which are used to determine the data bits. In one embodiment, the phase of a present 20 ms sample is rotated by the overall phase of the N×20 ms window. The present 20 ms sample is the 20 ms sample immediately adjacent to the right of the N×20 ms window and is the first 20 ms in the M×20 ms window. The weighting factor is then computed based on the phase angle of the phase rotated present sample, and is applied to the phase rotated present sample. The corresponding data bit is determined based on the real part or in-phase (I) component of the weighted phase rotated present sample. After the phase of the present sample is rotated, the sliding window is moved forward 20 ms to rotate the phase of the next sample.

The phase for phase rotation may also be predicted using a curve-fitting method, e.g., LMS method. In this embodiment, the phase change over time can be approximated by a second-order polynomial. The phase of each sample in the N×20 ms is computed and a curve-fitting method is used to determine the coefficients of the second-order polynomial that fits the phases of the samples. The second-order polynomial is then used to estimate the upcoming phase for the present sample.

In another embodiment, the present sample may be replaced with a M×20 ms window using MSDD to compute the coherent sum of the M×20 ms window. In this embodiment, the coherent sum of the M×20 ms window is rotated by the overall phase of the N×20 ms window. The weighting factor is determined based on the phase of the phase rotated coherent sum of the M×20 ms window. The real part of the coherent sum has the same sign as that of the 20 ms sample in the very left of the M×20 ms window with increased signal-to-noise ratio (SNR). The present sample may be though of as a special case of the M×20 ms window, in which M=1.

The phase compensated based data bit decoding method may be used when the feedback data bits are more accurate, which allows easier tracking of phase error using methods such as LMS prediction and/or the coherent sum of the sliding window. This phase information allows the decoding of the data bits for coming samples by compensating its phase error. The differential detected based may be used when the data bits cannot be decoded accurately enough to track the phase error.

Once the 20 ms samples have been phase rotated and weighted, a coherent sum of these 20 ms samples over several 30-second frames may be obtained to increase the signal-to-noise ratio. The coherent sum is performed by overlaying the frames and coherently summing the corresponding weighted phase rotated 20 ms samples of the frames. In other words, the weighted phase rotated 20 ms samples at the same positions in the frames are coherently summed. Only samples corresponding to the ephemeris are integrated over several consecutive frames since the ephemeris repeats in every frame and other navigation data, such as those of the almanac, do not repeat in every frame. The ephemeris data remains the same for every frame over a period of two hours.

Thus, the coherent sum or integration of consecutive frames results in an integrated frame, in which each integrated sample in the integrated frame is the accumulated energy of similarly placed weighted phase rotated 20 ms samples in the consecutive frames. Data bit decoding may be done by determining the sign of the real part or in-phase (I) component for each accumulated sample. The sign of the real part presents the phase information carrying data bit for the accumulated sample. If the sign is positive, the data bit is "1", otherwise the data bit is "0". Theoretically, the increase in signal-to-noise ratio (SNR) provided by integration is given by n*3 dB, where $2^n$=number of frames. Thus, a multiple frame decoding strategy may be employed to decode the data bits with increased SNR.

The data bit decoding may be performed each time a new frame is coherently summed to the previous frames. The data bit error is reduced by more coherent summing. The coherent integration of consecutive frames may continue until no bit error or very low bit error is indicated by the parity check bits.

The multiple frame decoding strategy may also be performed using the differential detection based decoding. As discussed above, the data bit for this decoding method is determined by the sign of Re[sum_m_hat]. Without noise, the imaginary part of sum_m_hat is zero. However, when noise is present, the imaginary part is greater than zero. To reduce the impact of the noise in the multiple frame strategy, a weighting factor may be computed for Re[sum_m_hat]. The weighting factor may be given by $$\text{weighting factor} = 1 - 2*(\arctan g|Q/I|)/pi \quad (11)$$

where Q=Im[sum_m_hat], I=Re[sum_m_hat]. The multiple frame strategy is then performed by summing weighted Re[sum_m_hat]s at the same positions in the frames. This summation provides an overall weighted Re[sum_m_hat] for each frame position in which the summation is computed. The corresponding data bit is then determined by the sign of the overall weighted Re[sum_m_hat]. This sign represents the phase transition between two consecutive samples. If the sign is positive, the data bit for the present 20 ms sample is the same as that of the previous 20 ms sample, otherwise the data bit for the present 20 ms sample is reversed to that of the previous 20 ms sample.

The multiple frame strategy may be performed using a combination of differential detection based decoding and phase compensation based decoding.

Although a down-sampling ratio of 20:1 was used in the preferred embodiment to down sample 20 1-ms samples into one 20-ms sample, other down-sampling ratios may also be used. Further, other lengths may be used for the sample block and sliding window besides 2560 ms and 320 ms. Further phase rotation may be performed by computing an overall phase of sample within a block or sliding window and rotating the phase of samples within the block or sliding window or adjacent samples by the overall phase to compensate for phase error.

Although the present invention has been described in terms of the presently preferred embodiments, it is to be understood that the disclosure is not to be interpreted as limiting. Various alterations and modifications will no doubt become apparent to those skilled in the art after having read this disclosure. For example, although the above embodiments have been described using the GPS system as an example, the techniques and methods may be used for other global satellite navigational systems including GLONASS, Galileo, secondary systems such as WASS, EGNOS, and MSAS, as well as hybrids of the above systems and also to any type direct sequence spread spectrum receivers. Accordingly, it is intended that the appended claims be interpreted as covering all alterations and modifications as fall within the spirit and scope of the invention.

Appendix A

Kalman Filter Based Tracking in Weak GPS Signal Environment

States Vector

Normally there are three states: phase, Doppler frequency and Doppler frequency change rate (alpha). Because the phase cannot be measured directly and must determine from I/Q, which might be very inaccurate due to noise under weak signal environment, only two states are chosen as the state vector, as $$\begin{bmatrix} f_k \\ \alpha_k \end{bmatrix}.$$

This also saves on the computation cost.

The state difference equation is given by Equation 1 below.

$$\begin{bmatrix} f_{k+1} \\ \alpha_{k+1} \end{bmatrix} = A \begin{bmatrix} f_k \\ \alpha_k \end{bmatrix} + w_k = \begin{bmatrix} 1 & T \\ 0 & 1 \end{bmatrix} \begin{bmatrix} f_k \\ \alpha_k \end{bmatrix} + \begin{bmatrix} w_{fk} \\ w_{\alpha k} \end{bmatrix} \quad \text{(Eq. 1)}$$

where A is the transition matrix and w is the noise vector, and T is the states updating period or more specifically the integration time.

The corresponding process noise covariance matrix is given by Equation 2 below.

$$Q = \begin{bmatrix} \sigma_f^2 + T^2 \sigma_\alpha^2 & T\sigma_\alpha^2 \\ T\sigma_\alpha^2 & \sigma_\alpha^2 \end{bmatrix} \quad \text{(Eq. 2)}$$

where $\sigma_f^2$ and $\sigma_\alpha^2$ are variances of frequency noise and frequency change rate noise, given by Equations 3 and 4.

$$\sigma_f^2 = E[w_f w_f^T] \quad \text{(Eq. 3)}$$

$$\sigma_\alpha^2 = E[w_\alpha w_\alpha^T] \quad \text{(Eq. 4)}$$

Measurement Vector

There are several measurements in the GPS baseband firmware, including I/Q values, predicted Doppler frequency and the calculated frequency change rate.

Under very weak signal environment, the I/Q values from GPS baseband hard are very noisy and the phase calculated based on these noisy I/Q values are inaccurate as well. Therefore, we do not choose the I/Q values or the corresponding phases as one of the measurements.

Doppler frequency is predicted through frequency analysis with long time integration. It is reliable even under weak signal environment. Therefore, we choose the predicted Doppler frequency as one measurement. For the frequency change rate, it is calculated from predicted Doppler frequency directly. Therefore, we do not choose it as a measurement. As a result, the measurement is $z_k = [f_{dk}]$.

The measurement difference equation is given by Equation 5.

$$z_k = [f_{dk}] = H \begin{bmatrix} f_k \\ \alpha_k \end{bmatrix} + v_k = \begin{bmatrix} 1 & 0 \end{bmatrix} \begin{bmatrix} f_k \\ \alpha_k \end{bmatrix} + [v_k] \quad \text{(Eq. 5)}$$

where H is the measurement matrix and v is the measurement noise. The corresponding covariance matrix of measurement noise is given by Equation 6.

$$R = [\sigma_n^2] \quad \text{(Eq. 6)}$$

where $\sigma_n^2$ is the variance of measurement noise $v_k$.

Note: The measurement is the Doppler frequency offset of the specific satellite. This measurement may be calculated as:

$$f_s - (f_{IF} + f_{dk}) + f_{clke} = \frac{\text{DDFS\_FREQ}}{2^{26}} f_s \quad \text{(Eq. 7)}$$

where $f_s$ is the sampling rate, with Nemerix RF module, $$f_s = \frac{16.367667}{3} \text{ MHz};$$

$f_{IF}$ is the standard intermediate frequency without Doppler frequency offset. With Nemerix RF module, $f_{IF}$=4.124 MHz. $f_{clke}$ is the clock error due to the inaccuracy of the TCXO in RF module. DDFS_FREQ is the value for the GPS baseband register setting.

From Equation 7, we can get the measurement $f_{dk}$ from Equation 8.

$$f_{dk} = \left(1 - \frac{\text{DDFS\_FREQ}}{2^{26}}\right) f_s - f_{IF} + f_{clke} \quad \text{(Eq. 8)}$$

Initial Parameters

There are two parameters which need to be initialized, states vector $$\begin{bmatrix} f_0 \\ \alpha_0 \end{bmatrix}$$

and the α posteriori estimate error covariance matrix $P_0$, which is a 2×2 matrix in accordance with the states vector.

As a first try, we set the initial parameters as followings:

$$\begin{bmatrix} f_0 \\ \alpha_0 \end{bmatrix} = \begin{bmatrix} 0 \\ 0 \end{bmatrix} \quad \text{(Eq. 9)}$$

$$P_0 = \begin{bmatrix} R & 0 \\ 0 & 1 \end{bmatrix} = \begin{bmatrix} \sigma_n^2 & 0 \\ 0 & 1 \end{bmatrix} \quad \text{(Eq. 10)}$$

Iteration of Status Prediction and Updating

The iteration of time update (prediction) is given by the following two equations:
(1) Project the states ahead;

$$\begin{bmatrix} \hat{f}_k^- \\ \hat{\alpha}_k^- \end{bmatrix} = A \begin{bmatrix} \hat{f}_{k-1}^- \\ \hat{\alpha}_{k-1}^- \end{bmatrix} = \begin{bmatrix} 1 & T \\ 0 & 1 \end{bmatrix} \begin{bmatrix} \hat{f}_{k-1}^- \\ \hat{\alpha}_{k-1}^- \end{bmatrix} \quad \text{(Eq. 11)}$$

(2) Project the error covariance ahead;

$$P_k^- = \quad \text{(Eq. 12)}$$

$$AP_{k-1}A^T + Q = \begin{bmatrix} 1 & T \\ 0 & 1 \end{bmatrix} P_{k-1} \begin{bmatrix} 1 & T \\ 0 & 1 \end{bmatrix}^T + \begin{bmatrix} \sigma_f^2 + T^2\sigma_\alpha^2 & T\sigma_\alpha^2 \\ T\sigma_\alpha^2 & \sigma_\alpha^2 \end{bmatrix}$$

The iteration of measurement update (correct) is given by the following three equations:
(1) Compute the Kalman gain;

$$K_k = P_k^- H^T (H P_k^- H^T + R)^{-1} \quad \text{(Eq. 13)}$$

The Kalman gain $K_k$ is a 2×1 matrix.
(2) Update the estimate with measurement $f_{dk}$;

$$\begin{bmatrix} \hat{f}_k \\ \hat{\alpha}_k \end{bmatrix} = \begin{bmatrix} \hat{f}_k^- \\ \hat{\alpha}_k^- \end{bmatrix} + K_k \left( f_{dk} - H \begin{bmatrix} \hat{f}_k^- \\ \hat{\alpha}_k^- \end{bmatrix} \right) = \begin{bmatrix} \hat{f}_k^- \\ \hat{\alpha}_k^- \end{bmatrix} + K_k (f_{dk} - \hat{f}_k^-) \quad \text{(Eq. 14)}$$

(3) Update the error covariance matrix;

$$P_k = (I - K_k H) P_k^- \quad \text{(Eq. 15)}$$

At this stage, we can set the entities of Q and R matrix are all constants. So both the estimate error covariance $P_k$ and the Kalman gain $K_k$ will stabilize quickly and then remain constants. If this is the case, these parameters can be pre-computed and stored in memory for real time use.

Summary

As the first stage, the Kalman filter is used to fine tune the predicted Doppler frequency. The Kalman filter follows the FFT analysis module, and the output from Kalman filter is sent to GPS baseband hardware to update the corresponding registers directly.

Appendix B

The Multiple Symbol Differential Detection (MSDD) Based Coherent Integration

MSDD involves making a joint decision with maximum likelihood within a interval of multiple 20 ms I/Q samples, and based on this joint data bit decision, all samples within the sliding window can be demodulated in order to get a coherent integration for the final differential detection.

Given a sequence of post correlation I/Q samples, each 20 ms samples is represented as $$r_k = \sqrt{E_k} e^{j\phi_k} e^{j\theta_k}$$

where $\phi_k$ is the phase error, $\theta_k$ is transmitted phase which takes either 0 or $\pi$, $E_k$ is the energy of 20 ms I/Q sample.

Suppose we have M samples within the sliding window of the future I/Q samples. Therefore, we have:

$$r_{k-m} = \sqrt{E_{k-m}} e^{j\phi_{k-m}} e^{j\theta_{k-m}}, \, m=0, \ldots, M-1$$

If we define $\Delta\phi_k$ to be the phase transition between two adjacent I/Q sample, thus $\Delta\phi_k$ will be either 0 or $\pi$, then a joint decision is made based on the maximum of the following quantity:

$$\eta = \left| r_{k-M-1} + \sum_{i=0}^{M-2} r_{k-i} e^{-j\sum_m^{M-i-2} \Delta\varphi_{k-j-m}} \right|^2$$

This statistic implies that we observe the received signal over M sample time intervals and from this observation make a simultaneous decision on M−1 data phase.

For an example of M=3:
Choose $\Delta\phi_k$ and $\Delta\phi_{k-1}$ if $\mathrm{Re}\{r_k \cdot r_{k-1}^* \cdot e^{-j\Delta\phi_k} + r_{k-1} \cdot r_{k-2}^* \cdot e^{-j\Delta\phi_{k-1}} + r_k \cdot r_{k-2}^* \cdot e^{-j(\Delta\phi_k + \Delta\phi_{k-1})}\}$ is the maximum Once we get the joint decision $\Delta\phi_k$ on M−1 data phase, all I/Q samples within sliding window of length M can be demodulated and summed up for later differential detection.

What is claimed is:
1. A method of operating a navigation receiver, comprising:
   (a) receiving continuous 1-ms correlation samples for in-phase (I) and quadrature-phase (Q) components of navigation data;
   (b) coherently integrating past n×20 ms samples and coherently integrating future m×20 ms samples, wherein n and m are positive integers and at least one of n or m is larger than one; and
   (c) performing differential detection between the past and future integrations to determine a data bit.
2. The method of claim 1, further comprising: after a first round of navigation data bit decisions are made,
   using parity check to identify possible bit errors; and
   if the parity check indicates an unacceptable error rate, adopting a multiple frame overlay strategy until the bit errors are eliminated.
3. A multiple frame overlay method, comprising:
   (a) receiving continuous 1-ms correlation samples for in-phase (I) and quadrature-phase (Q) components of navigation data that is repeated in frames received over time;
   (b) down-sampling 20 1-ms correlation I and Q samples within one navigation data bit interval into one 20-ms I and Q sample;
   (c) rotating the phase of each 20-ms I and Q sample after down sampling;
   (d) computing a weighting factor for each phase rotated 20-ms I and Q sample and applying the weighting factor to the phase rotated 20-ms I sample;
   (e) summing the weighted phase rotated 20-ms I samples at the same frame positions each time a frame is received;
   (f) using a recursive navigation data bits decoding scheme to detect the navigation data bits; and
   (g) repeating steps (c) through (f) until data error bit is reduced to a low level or eliminated.

4. The method of claim 3, wherein the recursive navigation data bits decoding scheme comprises:
- (h) performing phase compensation for each 20-ms I and Q sample to reduce the effect of residue Doppler frequency and initial phase; and
- (i) determining the navigation data bits according to the signs of the sums of the weighted phase rotated 20-ms in-phase (I) samples.

5. The method of claim 4, wherein the phase compensation comprises using a tracking algorithm to determine the residue Doppler frequency.

6. The method of claim 4, wherein the phase compensation comprises using a tracking algorithm to determine a rate of change of the Doppler frequency.

7. The method of claim 3, wherein computing the weighting factor for each phase rotated 20-ms sample comprises:
- (h) performing phase compensation for each 20-ms I and Q sample to reduce the effect of Doppler frequency;
- (i) using feedback data bit decisions to demodulate all of the 20-ms I and Q samples within a sliding window and integrating the demodulated 20-ms I and Q samples within the sliding window;
- (j) computing an overall phase reference based on the coherent integration of the sliding window;
- (k) rotating the phase of a present 20-ms I and Q sample adjacent to the sliding window with said overall phase reference;
- (l) computing a weighting factor based on a phase angle of the present 20-ms phase rotated I and Q sample; and
- (m) applying the weighting factor to the present 20-ms phase rotated I and Q sample.

8. A method for operating a navigation receiver, comprising:
- (a) receiving continuous 1-ms correlation samples for in-phase (I) and quadrature-phase (Q) components of navigation data;
- (b) performing a coherent integration of previous I and Q samples within a sliding window of length n×20 ms based on feedback data bit decisions to obtain a phase reference, wherein n is a positive integer;
- (c) performing a coherent integration of future I and Q samples within a sliding window of length m×20 ms using multiple symbol differential detection, wherein m is a positive integer; and
- (d) using differential detection to detect navigation data bits based on the phase reference and the coherent integration of the future I and Q samples.

9. The method of claim 8, wherein a dot product or phase transition based method is used in the differential detection.

10. The method of claim 8, wherein performing the sliding window coherent integration of the future I and Q samples comprises:
- (e) down-sampling 20 1-ms I and Q samples within one navigation data bit interval into one 20-ms I and Q sample;
- (f) performing phase compensation for each 20-ms I and Q sample to reduce the effect of residue Doppler frequency;
- (g) making a joint data bit decision on M phase compensated 20-ms I and Q samples within the future sliding window based on a maximum likelihood of jointed differential detection;
- (h) demodulating all of the 20-ms I and Q samples within the future sliding window with said joint data bit decision and coherently integrating all of the demodulated 20-ms I and Q samples.

11. A navigation receiver, comprising:
a processor receiving continuous 1-ms correlation samples for in-phase (I) and quadrature-phase (Q) components of navigation data;
memory coupled to the processor for storing at least one frame of navigation data;
wherein the processor is configured to coherently integrate past n×20 ms samples and coherently integrate future m×20 ms samples, wherein n and m are positive integers and at least one of n or m is larger than one, and perform differential detection between the past and future integrations to determine a data bit.

12. A navigation receiver, comprising:
a processor receiving continuous 1-ms correlation samples for in-phase (I) and quadrature-phase (Q) components of navigation data;
memory coupled to the processor for storing at least one frame of navigation data;
wherein the processor is configured to decode data bits by:
- (a) down-sampling 20 1-ms correlation I and Q samples within one navigation data bit interval into one 20-ms I and Q sample that is repeated in frames received over time;
- (b) rotating the phase of each 20-ms I and Q sample after down sampling;
- (c) computing a weighting factor for each phase rotated 20-ms I and Q sample and applying the weighting factor to the phase rotated 20-ms I sample;
- (d) summing the weighted phase rotated 20-ms I samples at the same frame positions each time a frame is received;
- (e) using a recursive navigation data bits decoding scheme to detect the navigation data bits; and
- (f) repeating steps (b) through (e) until data error bit is reduced to a low level or eliminated.

13. The receiver of claim 12, wherein the processor is configured to use parity check bits to identify possible errors after a first round of navigation data bit decoding, and if the parity check indicates an error, adopt a multiple frame copies strategy until the bit errors are eliminated.

14. The receiver of claim 12, wherein the recursive navigation data bits decoding scheme comprises:
- (g) performing phase compensation for each 20-ms I and Q sample to reduce the effect of residue Doppler frequency and initial phase; and
- (h) determining the navigation data bits according to the signs of the sums of the weighted phase rotated 20-ms in-phase (I) samples.

15. The receiver of claim 14 wherein the receiver uses a tracking algorithm to determine the residue Doppler frequency.

16. The receiver of claim 14 wherein the receiver uses a tracking algorithm to determine a rate of change of the Doppler frequency.

17. The receiver of claim 12, wherein the processor computes the weighting factor for each phase rotated 20-ms sample by:
- (g) performing phase compensation for each 20-ms I and Q sample to reduce the effect of Doppler frequency;
- (h) using feedback data bit decisions to demodulate all of the 20-ms I and Q samples within a sliding window and integrating the demodulated 20-ms I and Q samples within the sliding window;
- (i) computing an overall phase reference based on the coherent integration of the sliding window;
- (j) rotating the phase of a present 20-ms I and Q sample adjacent to the sliding window with said overall phase reference;

(k) computing a weighting factor based on a phase angle of the present 20-ms phase rotated I and Q sample; and (l) applying the weighting factor to the present 20-ms phase rotated I and Q sample.

18. A method for operating a navigation receiver, comprising: a processor receiving continuous 1-ms correlation samples for in-phase (I) and quadrature-phase (Q) components of navigation data; memory coupled to the processor for storing at least one frame of navigation data; wherein the processor is configured to decode data bits by:

(a) performing a coherent integration of previous I and Q samples within a sliding window of length n×20 ms based on feedback data bit decisions to obtain a phase reference, wherein n is a positive integer;

(b) performing a coherent integration of future I and Q samples within a sliding window of length m×20 ms using multiple symbol differential detection, wherein m is a positive integer; and (c) using differential detection to detect navigation data bits based on the phase reference and the coherent integration of the future I and Q samples.

19. The receiver of claim 18, wherein the processor uses a dot product or phase transition based method in the differential detection.

20. The receiver of claim 18, wherein the processor performs the sliding window coherent integration of the future I and Q samples by:

(d) down-sampling 20 1-ms I and Q samples within one navigation data bit interval into one 20-ms I and Q sample;

(e) performing phase compensation for each 20-ms I and Q sample to reduce the effect of residue Doppler frequency;

(f) making a joint data bit decision on M phase compensated 20-ms I and Q samples within the future sliding window based on a maximum likelihood of jointed differential detection;

(g) demodulating all of the 20-ms I and Q samples within the future sliding window with said joint data bit decision and coherently integrating all of the demodulated 20-ms I and Q samples.

* * * * *

UNITED STATES PATENT AND TRADEMARK OFFICE
CERTIFICATE OF CORRECTION

PATENT NO.       : 8,094,758 B2
APPLICATION NO.  : 11/612426
DATED            : January 10, 2012
INVENTOR(S)      : Wang et al.

It is certified that error appears in the above-identified patent and that said Letters Patent is hereby corrected as shown below:

On the Title Page, in Field (56), under "OTHER PUBLICATIONS", in Column 2, Line 5, delete "IEE" and insert -- IEEE --, therefor.

On the Title Page, in Field (56), under "OTHER PUBLICATIONS", in Column 2, Line 7, delete "IEE" and insert -- IEEE --, therefor.

In Column 3, Line 6, delete "TIFF" and insert -- TTFF --, therefor.

Signed and Sealed this
Twelfth Day of March, 2013

Teresa Stanek Rea
*Acting Director of the United States Patent and Trademark Office*